United States Patent [19]

Feldman et al.

[11] Patent Number: 5,622,774
[45] Date of Patent: Apr. 22, 1997

[54] REINFORCED THERMAL PROTECTIVE SYSTEM

[75] Inventors: Rubin Feldman, Ladue; Edward W. Taylor, Manchester, both of Mo.

[73] Assignee: Thermal Science, Inc., Fenton, Mo.

[21] Appl. No.: 368,382

[22] Filed: Dec. 29, 1994

Related U.S. Application Data

[63] Continuation of Ser. No. 14,816, Feb. 8, 1993, abandoned.

[51] Int. Cl.$^6$ ........................................ B32B 7/00
[52] U.S. Cl. ........................ 442/136; 428/36.1; 428/36.2; 428/182; 428/408; 428/413; 428/902; 428/920; 428/921; 442/179
[58] Field of Search ........................... 252/606; 428/245, 428/255, 408, 902, 920, 921, 246, 247, 340, 413, 182, 36.1, 36.2

[56] References Cited

U.S. PATENT DOCUMENTS

| | | |
|---|---|---|
| 2,680,077 | 6/1954 | Nielsen et al. . |
| 3,022,190 | 2/1962 | Feldman . |
| 3,284,216 | 11/1966 | Kaplan . |
| 3,300,139 | 1/1967 | Feldman . |
| 3,849,178 | 11/1974 | Feldman . |
| 3,913,290 | 10/1975 | Billing et al. . |
| 3,915,777 | 10/1975 | Kaplan . |
| 4,018,962 | 4/1977 | Pedlow ................................ 428/245 |
| 4,064,359 | 12/1977 | Peterson et al. .................... 428/215 |
| 4,069,075 | 1/1978 | Billing et al. . |
| 4,276,332 | 6/1981 | Castle .................................. 428/36 |
| 4,276,344 | 6/1981 | Frosch ................................ 428/260 |
| 4,292,358 | 9/1981 | Fryer et al. ......................... 428/135 |
| 4,324,830 | 4/1982 | Bilow .................................. 428/257 |
| 4,403,075 | 9/1983 | Byrd et al. . |
| 4,493,945 | 1/1985 | Feldman ............................. 174/68 C |
| 4,529,467 | 7/1985 | Ward et al. ........................ 156/307.3 |
| 4,687,785 | 8/1987 | Parker et al. . |
| 4,818,595 | 4/1989 | Ellis .................................... 428/245 |
| 5,401,793 | 3/1995 | Kobayashi et al. . |

FOREIGN PATENT DOCUMENTS

| | | |
|---|---|---|
| 1497659 | 1/1978 | United Kingdom . |
| 8503032 | 7/1985 | WIPO . |

*Primary Examiner*—James J. Bell
*Attorney, Agent, or Firm*—Polster, Lieder, Woodruff & Lucchesi

[57] ABSTRACT

Coating compositions for blocking heat from hyperthermal sources are reinforced with high-temperature, high emissivity, open weave fabrics. The coating compositions contain materials which actively respond to excessively high temperatures by undergoing endothermic processes or by swelling, preferably by both. The preferred fabrics are made of graphite or cardo-polymer yarns. The reinforced compositions may be applied directly to a substrate, or they may be molded into self-supporting shapes which are applied to the substrate or are themselves structural units.

18 Claims, 3 Drawing Sheets

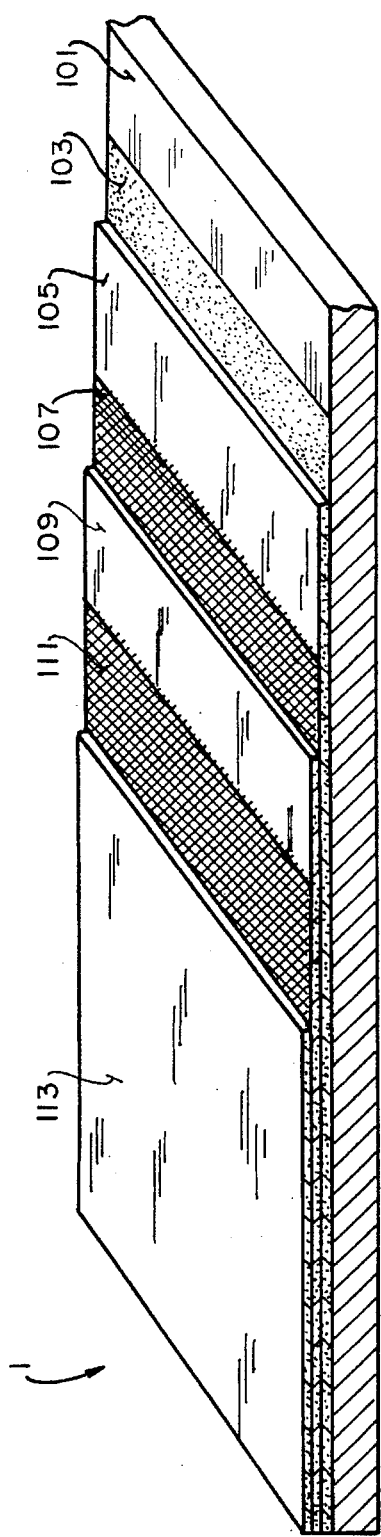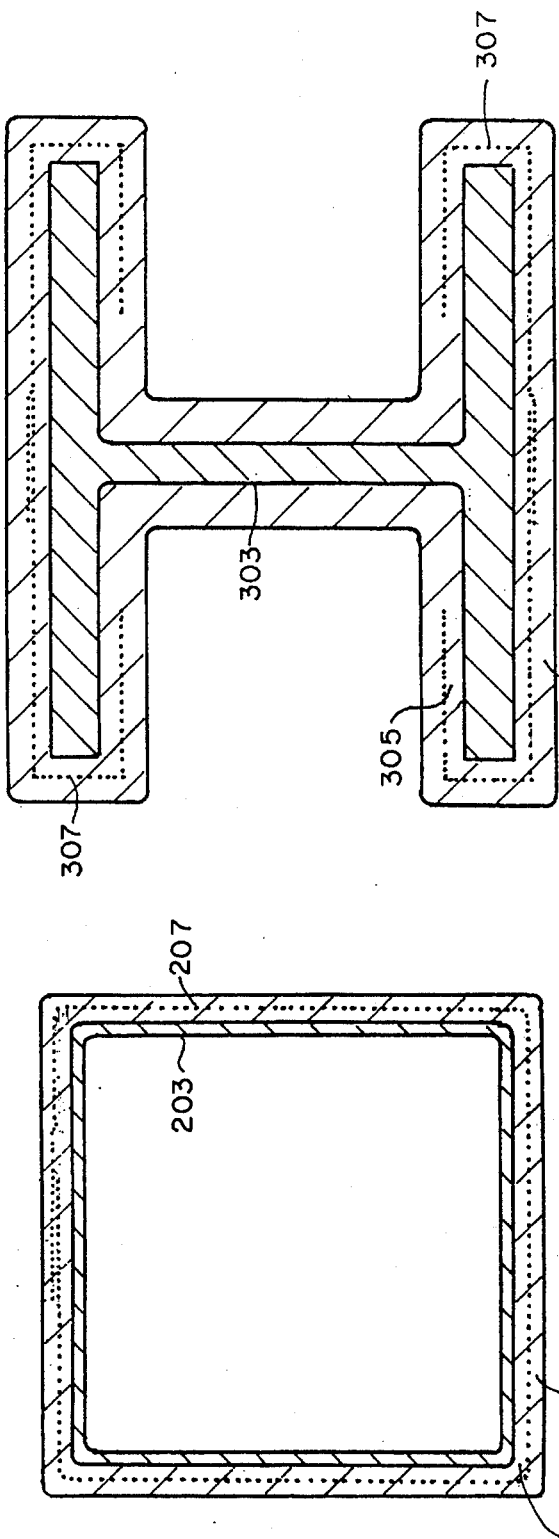

REINFORCED THERMAL PROTECTIVE SYSTEM

This is a continuation application of application Ser. No. 08/014,816, filed Feb. 8, 1993, now abandoned.

BACKGROUND OF THE INVENTION

This invention relates to systems for resisting thermal extremes and flame. It has particular application to systems which protect underlying substrates. It also relates to methods of providing such protection.

The situations in which it is desirable to protect substrates from heat and flame include, for example, protecting static structures such as petroleum storage tanks, chemical production equipment, electrical cable trays, and structural steel from the spread of fire and protecting transportation equipment such as tank cars and aircraft cabins from the same risks.

Numerous thermal protective coating compositions and systems for applying them are known. Some of the compositions are foamed passive insulative compositions which protect merely by their low thermal conductivity and their thickness as applied. These include foamed cement or intumesced silicates. The present invention is not concerned with such systems.

Other compositions provide active thermal protection. Some intumesce when heated to form a thick closed cell protective layer over the substrate. These include silicate solutions or ammonium phosphate paints or compositions such as those disclosed in Nielsen et al., U.S. Pat. No. 2,680,077, or Kaplan, U.S. Pat. No. 3,284,216. Other active thermal protective compositions include constituents which sublime at a predetermined temperature, such as those disclosed in Feldman, U.S. Pat. No. 3,022,190. The active thermal protective compositions disclosed in Feldman, U.S. Pat. No. 3,849,178 are particularly effective; when subjected to thermal extremes, these compositions both undergo an endothermic phase change and expand to form a continuous porosity matrix. The term "active" is applied herein to indicate thermal protective compositions which respond to thermal extremes either by expanding or by undergoing a highly endothermic change, or both.

Various methods and structures have also been used or proposed for applying these thermal protective coating compositions. The most frequent approach is to apply the compositions directly to the substrate, without additional structure. For many applications, however, a reinforcing material, such as fiberglass sheet or a wire mesh, has been embedded in the coating composition to strengthen the composition and prevent it from cracking or falling off the substrate under conditions of extreme vibration, such as explosion or earthquake, or under conditions of flame or thermal extreme. Reinforcement has been found to be particularly important when the thickness of the composition exceeds about one-quarter inch (4 mm) or when the composition is rated at more than about one-half hour in a standard fire test. Examples of this approach are found in Feldman, U.S. Pat. No. 3,022,190, Billing et al, U.S. Pat. No. 3,913,290, Kaplan. U.S. Pat. No. 3,915,777, and Billing et al, U.S. Pat. No. 4,069,075. Sometimes the compositions are first applied to a reinforcing structure such as a flexible tape or flexible wire mesh, and the combined structure is applied to the substrate. Examples of this approach are found in Feldman, U.S. Pat. No. 3,022,190, Pedlow, U.S. Pat. No. 4,018,962, Peterson et al. U.S. Pat. 4,064,359, Castle, U.S. Pat. No. 4,276,332, Fryer et al, U.S. Pat. No. 4,292,358, and Feldman, U.S. Pat. No. 4,493,945. In these last-mentioned systems, the purpose of the reinforcing structure may be both to strengthen the resulting composite and to permit its application to a substrate without directly spraying, troweling or painting the uncured coating compositions onto the substrate.

In any of the foregoing methods and structures, multiple layers are frequently applied to the substrate to provide additional protection.

The use of reinforcing structures in active thermal protective compositions, however, has not been completely successful. Fiberglass sheet embedded in active thermal protective compositions has been found to embrittle with heat, and the composition in which it is embedded may crack and fail under fire conditions. Silicone fabrics suffer similar problems. Metal mesh is difficult to apply; it generally requires studs to mount it on the underlying substrate, and the stiffness of the mesh makes it difficult to form and to work with. Presently known systems and methods, moreover, are not as efficient, in terms of length of protection for a given weight of protective composition, as desirable. Efficiency is particularly important because in many applications weight or volume is critically limited.

SUMMARY OF THE INVENTION

One of the objects of this invention is to provide systems and methods for providing more efficient protection against hyperthermal conditions than presently known systems and methods.

Another object is to provide such systems and methods which are adaptable to a wide variety of applications.

Another object is to provide such systems which are easy to apply and extremely effective.

Other objects of this invention will be apparent to those skilled in the art in light of the following description and accompanying drawings.

In accordance with this invention, generally stated, systems for protection against hyperthermal heating are provided which include an active thermal protective composition and a foraminous layer of a cloth embedded in the composition, the cloth comprising a conformable, non-self-supporting, high-temperature, high-emissivity material.

Preferably, the cloth is formed of a material with a heat-resistant carbon backbone. Most preferably the material is graphite, or a cardo polymer of the general type disclosed and claimed in commonly owned U.S. Pat. No. 4,687,785, Parker et al. Pyrolytic graphite is a particularly good but presently expensive material.

Preferably the cloth is an open weave, having a mesh of from four to two hundred openings per inch. Preferably, the cloth has a weight of at least 0.5 oz. per square yard (seventeen grams per square meter), most preferably at least 1.0 oz. per square yard (34 grams per square meter). Also preferably, the cloth is formed of multi-fiber yarn.

The cloth may also be formed as a continuous or close weave sheet with perforations formed in the material, but this arrangement has been found to be far inferior to the use of an open weave material.

The size of the foramina and the thickness of the cloth are determined by the characteristics of the particular system and the use to which the system is put. The cloth should be strong enough to prevent cracking of the composition under both thermal and percussive extremes, and the foramina should be large enough to permit the uncured composition to exude through the foramina.

The active thermal protective composition may include components which cause the coating to swell and provide a protective blanket when exposed to heat, or they may include a composition which undergoes an endothermic change to produce a gas. Preferably, the composition both swells and includes a component which undergoes an endothermic phase change, as described in Feldman, U.S. Pat. No. 3,849,178, which is hereby incorporated by reference.

In some preferred embodiments, the carbon-backbone cloth is covered with a second layer of the active thermal protective composition. To provide longer protection, another piece of the carbon-backbone cloth is applied over the second layer of the active thermal protective composition, and a third layer of the active thermal protective composition is applied over the second piece of cloth as a finish layer.

The systems of the present invention have been found to give protection on the order of 20–30% longer than fiberglass-reinforced systems under the same test conditions of high temperature and high shear forces. Therefore, greater thermal protection can be given with the same thickness of composition, without sacrificing physical properties of the composition. Alternatively, the thickness and weight of the composition may be decreased without sacrificing thermal protection.

In one embodiment, the system is applied by applying the first layer of the active thermal protective composition directly to a substrate, then rolling or pressing in a layer of the foraminous cloth, then applying another layer of the composition. Multiple layers may be formed by alternately applying composition and the foraminous cloth.

In another embodiment, the graphite or cardo-polymer cloth is laid in a form, the composition is applied to the formed cloth so that it extends through the weave of the cloth, then the cured composition/cloth composite is applied as a unit to a substrate. In this embodiment, the composite structure is preferably in the form disclosed in the aforementioned Feldman, U.S. Pat. No. 4,493,945, with spacers integrally formed in the cloth. This approach yields a lighter, more efficient structure than that of Feldman, U.S. Pat. No. 4,493,945. In all of these examples, the cloth is preferably embedded below the heat-receiving face of the active thermal protective composition.

Yet another approach is to apply the active thermal protective composition to the inside of a truss-core graphite or cardo-polymer cloth. The use of an active thermally protective composition as a filler in a three-dimensional cloth system such as a truss-core system is another aspect of the present invention. In this embodiment, the outer surface of the high-temperature, high emissivity cloth truss-core structure may be exposed directly to heat, or the heat-receiving face may be covered with a finish coat of the active thermal protective composition. Such composites may be utilized as stand-alone structural members.

Other aspects of the invention will be better understood in the light of the following description of the preferred embodiments.

BRIEF DESCRIPTION OF THE DRAWINGS

In the drawings, FIG. 1 is a diagrammatic perspective view, partially in section, of a substrate protected by a thermal protective system of the present invention, applied directly to the substrate.

FIG. 5 is a sectional view of a tubular steel structural member protected by a thermal protective system of the present invention.

FIG. 6 is a sectional view of a beam protected by a thermal protective system of the present invention.

DESCRIPTION OF THE PREFERRED EMBODIMENTS

Figure 2:
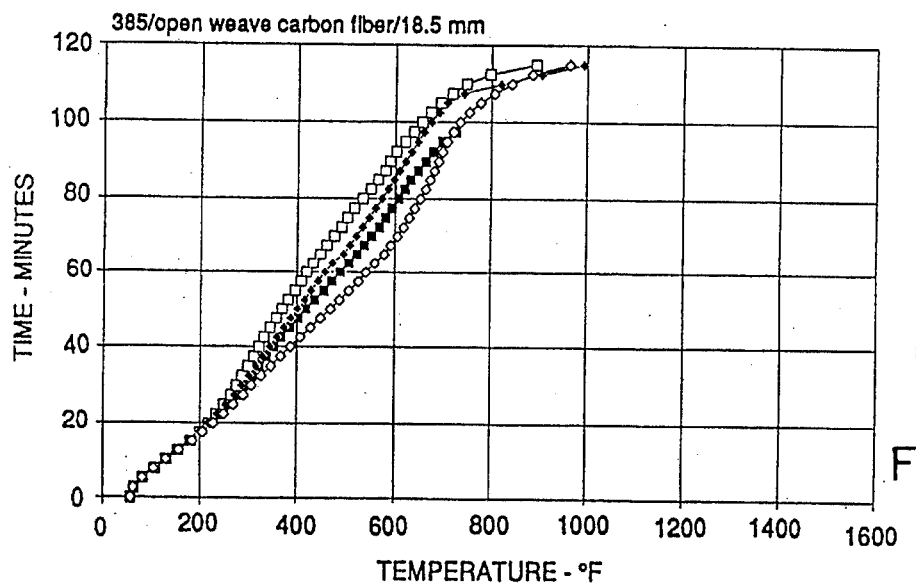
FIG. 2 is a graph representing the time-temperature curves of the system of FIG. 1 when subjected to a standard fire test.

The following Examples are illustrative of systems and methods of the present invention, and of their performance in comparison with previously known systems and methods.

EXAMPLE 1

A thermal protective system of the present invention is prepared by applying to a steel substrate an active thermal protective coating which both undergoes an endothermic phase change and expands to form a continuous porosity matrix. An example of such a composition is as follows:

|  | Weight percent |
| --- | --- |
| Molybdenum hexacarbonyl | 60 |
| Epoxy Resin | 15 |
| Polysulfide Polymer | 15 |
| Inorganic Fibers | 10 |

While the composition remains tacky, a sheet of loose weave graphite cloth is rolled into the surface of the composition with a standard roller. The loose weave graphite cloth is highly flexible and conformable, and drapes over edges. A second layer of the active thermal protective composition is sprayed onto the cloth, covering the cloth. The system is cured and provides superior fire resistance as compared with similar systems made using fiberglass cloth or metal mesh in place of the graphite cloth.

EXAMPLE 2

A formal test of the system was made using the system shown in FIG. 1. As shown in FIG. 1, the system 1 includes a substrate 101, to which is applied a primer 103, a coating 105 of an active thermal protective composition, a layer 107 of reinforcement (graphite cloth), a second coating 109 of the active thermal protective composition, a second layer 111 of reinforcement, and a third layer 113 of the active thermal protective composition.

In this test, three identical samples were prepared, differing only in their use of loose weave graphite, wire mesh, and fiberglass cloth as the reinforcing material. The graphite cloth was a loose weave scrim cloth having a weight of 1.6 oz. per square yard (55 grams per meter) and a six mesh per inch (about 236 openings per meter) weave. The metal mesh was a one-half inch (about 80 openings per meter), 19 gauge, galvanized steel fabric. The fiberglass cloth was a woven, six mesh per inch (about 236 openings per meter) cloth having a weight of 1.9 oz. per square yard (about 65 grams per square meter).

The active thermal protective composition in these tests was a two-component epoxy-based thermally activated coating, which when exposed to flame or thermal extreme, volatilizes at fixed temperatures, exhibiting a small volume increase through the formation of an open cell matrix, and absorbs and blocks heat to protect the substrate material. The composition included a polyfunctional alcohol, a 1,3,5-triazine-2,4,6-triamine, an epoxy resin and a polymer of bis-(ethylene oxy)methane containing disulfide linkages and curable terminal thiol groups (a polysulfide). The composition had a nominal formula as follows:

|  | Weight percent |
| --- | --- |
| Melamine | 5 |
| Ammonium polyphosphate | 25 |
| Pentaerythritol | 10 |
| Epoxy resin | 30 |
| Polysulfide | 20 |
| Glass fibers | 5 |
| Catalyst | 5 |

The substrate in all tests was a one foot by one foot (0.3 meter square) by 6.5 millimeters thick steel plate. On the back side of each plate were mounted four thermocouples (designated C5–C8), one in the center of each quadrant of the plate. The test specimens were comprised of two layers of the specific reinforcing material, uniformly embedded in the active thermal protective composition. This is shown in FIG. 1, which shows graphite cloth, by way of example only; the metal mesh and fiberglass were done the same way. The overall thickness of the active thermal protective composition was eighteen millimeters in each case. The test specimens were all allowed to cure before testing in the fire test facility.

The test facility produces a heat flux of about 325 kilowatts per square meter and a temperature between 900 and 1100 degrees Celsius.

The limiting temperature for the test is an average backside temperature of 752 degrees F. (400° C.), which is a standard in the field of protecting structural steel in the petroleum industry.

Figure 3:
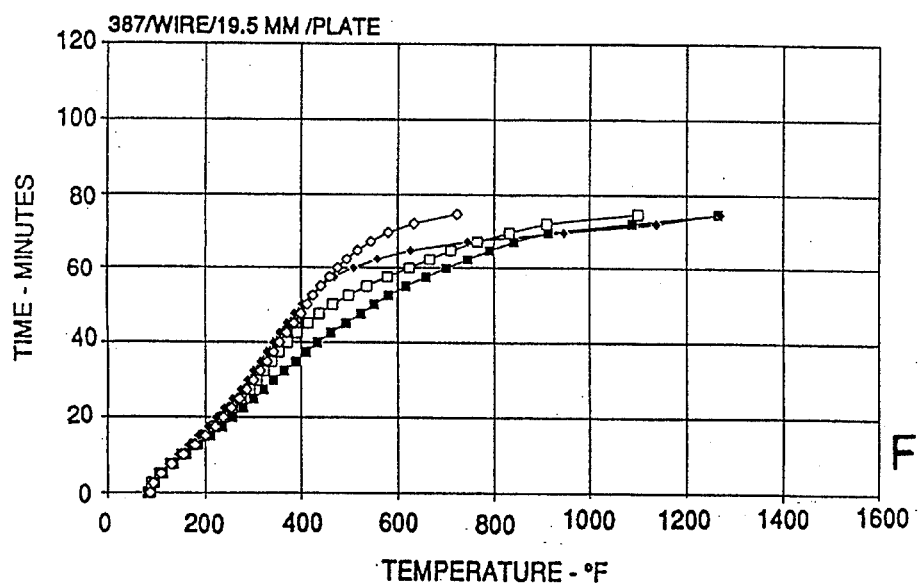
FIG. 3 is a comparative graph representing the time-temperature curves of a system corresponding to that of FIG. 1, but using a wire mesh reinforcement.
Figure 4:
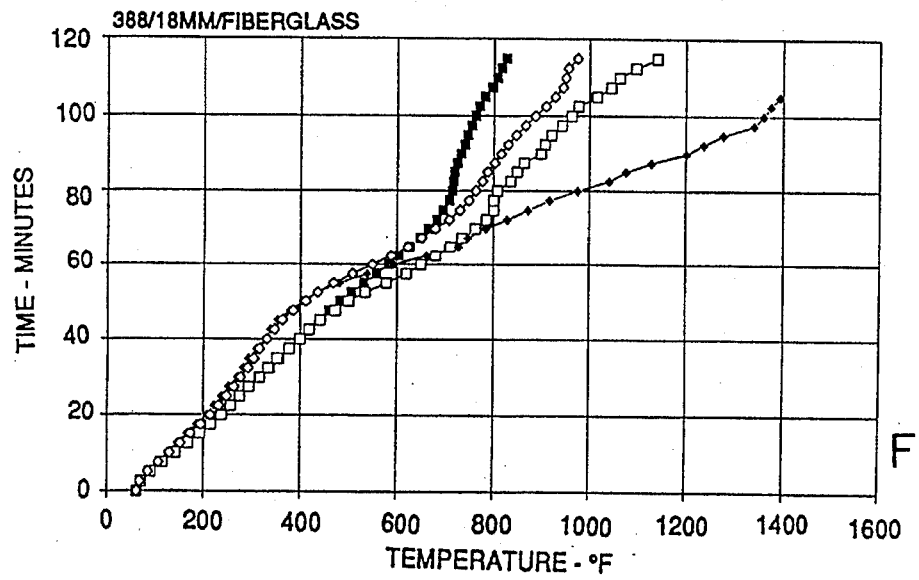
FIG. 4 is a comparative graph representing the time-temperature curves of a system corresponding to that of FIG. 1, but using a fiberglass reinforcement.

The comparative performance of the three systems is shown in FIGS. 2–4. The results were dramatic. The test results are also summarized in the following TABLE 1:

TABLE 1

| Time | Temperature °F. | | | | | |
| --- | --- | --- | --- | --- | --- | --- |
| | Graphite | | Wire Mesh | | Fiberglass | |
| (minutes) | Avg. | Max | Avg. | Max | Avg. | Max |
| 0 | 58 | 58 | 86 | 89 | 63 | 64 |
| 10 | 131 | 132 | 154 | 162 | 136 | 144 |
| 20 | 222 | 229 | 240 | 258 | 225 | 239 |
| 30 | 290 | 307 | 310 | 343 | 297 | 319 |
| 40 | 352 | 387 | 377 | 435 | 366 | 401 |
| 50 | 415 | 469 | 459 | 551 | 450 | 500 |
| 60 | 477 | 541 | 578 | 701 | 595 | 652 |
| 70 | 539 | 606 | 819 | 914 | 724 | 784 |
| 80 | 592 | 654 | | | 827 | 976 |
| 90 | 642 | 692 | | | | |

TABLE 1-continued

| Time | Temperature °F. | | | | | |
| --- | --- | --- | --- | --- | --- | --- |
| | Graphite | | Wire Mesh | | Fiberglass | |
| (minutes) | Avg. | Max | Avg. | Max | Avg. | Max |
| 100 | 724 | 735 | | | | |
| 110 | 843 | 918 | | | | |

Numerous variations in the thermal protective system and methods of the present invention will occur to those skilled in the art.

Merely by way of example, as shown in FIG. 5, the substrate may be a tubular column 203, with the active thermal protective composition 205 applied directly to the surface of the column and a single piece 207 of the open-weave graphite fabric reinforcement, embedded in the composition, extending completely around the column.

As shown in FIG. 6, the substrate may be an H-beam 303, and four pieces of the open-weave graphite cloth 307 may extend across the outer faces of the flanges and around their edges; in this embodiment, cloth reinforcement is omitted entirely in the web of the beam. An active thermal protective composition 305 is applied completely around the beam, both under and over the graphite cloth.

Figure 7:
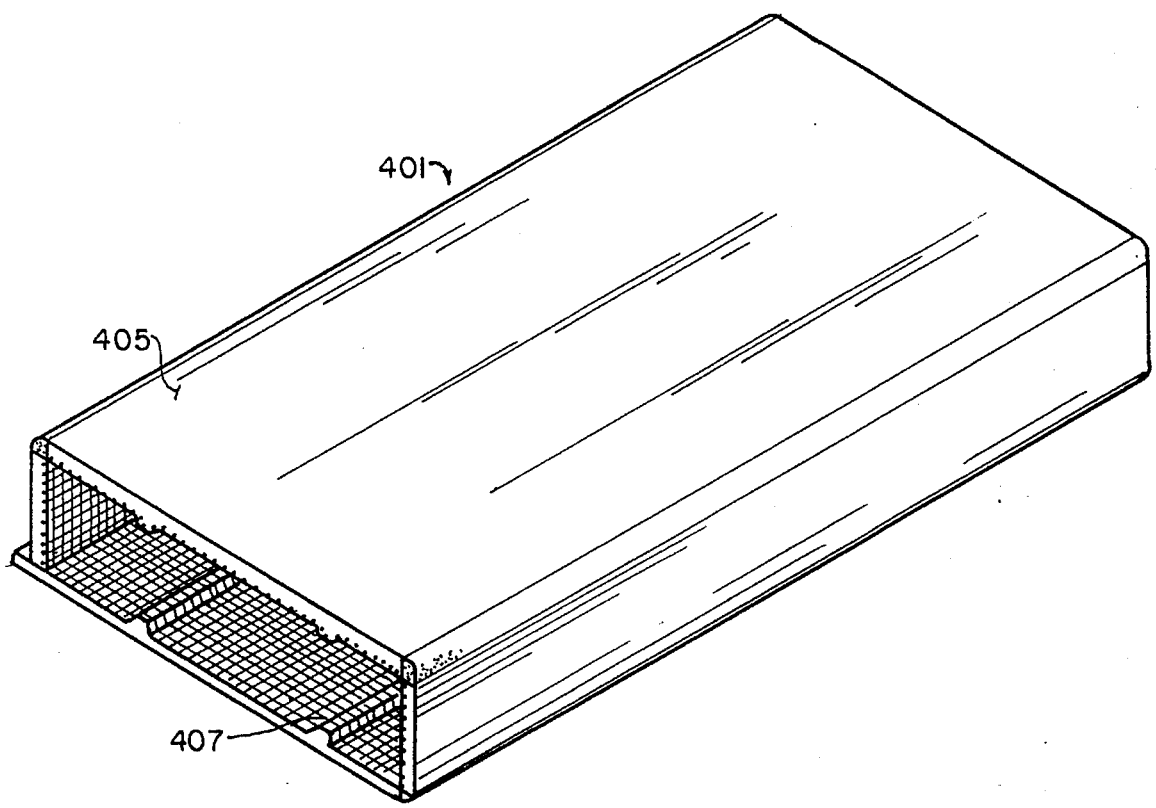
FIG. 7 is a sectional view of a pre-formed, self-supporting system of the present invention for application to a substrate.

As shown in FIG. 7, a pre-formed, self-supporting structure of the type disclosed in Feldman, U.S. Pat. No. 4,493,945, may be formed by substituting the graphite or cardo-polymer cloth of the present invention for the metal mesh of that patent. The graphite or cardo-polymer cloth 407 is laid in a form having transverse grooves corresponding to the ridges of the finished structure. The cloth conforms readily to the shape of the form, particularly when an active thermal protective composition 405 is applied to it. The thermal protective composition is sprayed onto the cloth so that it extends through the weave of the cloth, and the composition is allowed to cure. The composition/cloth composite structure 401 is then applied as a unit to a substrate.

Figure 8:
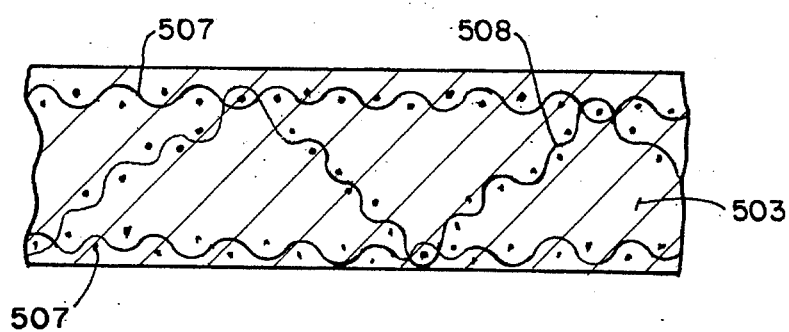
FIG. 8 is a sectional view of a truss-core system of the present invention, for application to a substrate or as a stand-alone structural element.

As shown in FIG. 8, the system of the present invention may also be applied other self-supporting structures, which may themselves be structural elements. In this embodiment, a truss-core fabric is utilized having two pieces 507 of open-weave graphite cloth connected by an integrally woven corrugation 508 formed of the same material. The corrugations run transverse of the material. Into the corrugations is introduced by extrusion an active thermal protective composition 503. The composition opens the corrugations and when cured forms a structure which will exhibit remarkable resistance to hyperthermal conditions.

Numerous other active thermal protective compositions may be utilized in any of the illustrative embodiments, or others within the scope of the appended claims, including those active thermal protective compositions mentioned herein. The graphite or other carbon-backbone, low hydrogen cloth may be applied in other ways, such as by direct attachment to the substrate by spot adhesion, pinning, or otherwise. These variations are merely illustrative.

We claim:

1. A system for protection against hyperthermal heating comprising an active thermal protective composition and at least one foraminous layer of a cloth embedded in the composition, the active thermal protective composition responding to thermal extremes by exhibiting a small volume increase through the formation of an open cell matrix and undergoing an endothermic phase change, the cloth comprising a conformable, non-self-supporting, high-temperature, high-emissivity graphite material, the system providing at least 20% longer protection under conditions of high temperature and high shear forces than a similar system in which the cloth is a fiberglass material.

2. The system of claim 1 wherein the cloth is an open weave, having a mesh of from four to two hundred openings per inch.

3. The system of claim 2 wherein the cloth is formed of multi-fiber yarn.

4. The system of claim 1 wherein the cloth has a weight of at least 0.5 oz. per square yard.

5. The system of claim 4 wherein the cloth has a weight of at least 1.0 oz. per square yard.

6. The system of claim 1 wherein the cloth is strong enough to prevent cracking of the composition under both thermal and percussive extremes, and includes foramina large enough to permit the uncured composition to exude through the foramina.

7. The system of claim 1 wherein the active thermal protective composition includes at least one component which undergoes an endothermic change to produce a gas when exposed to hyperthermal conditions.

8. The system of claim 7 wherein the composition both swells and includes a component which undergoes an endothermic phase change when exposed to hyperthermal conditions.

9. The system of claim 1 wherein the composition is applied directly to a substrate to be protected.

10. The system of claim 1 wherein the cloth and the composition form a self-supporting structure.

11. The system of claim 10 wherein the structure includes integral spacers formed therein.

12. The system of claim 10 wherein the composition is encased in a structure formed of two pieces of the cloth spaced from each other.

13. The system of claim 1 wherein the cloth is attached to a substrate independent of the composition.

14. A system for protection against hyperthermal heating comprising an active thermal protective composition and at least one layer of a woven cloth embedded in the composition, the active thermal protective composition responding to thermal extremes by exhibiting a small volume increase through the formation of an open cell matrix and undergoing an endothermic phase change from a solid to a gas, the cloth comprising a graphite material, the system providing at least 20% longer protection under conditions of high temperature and high shear forces than a similar system in which the cloth is a fiberglass material.

15. The system of claim 14 wherein the cloth is formed of a multi-fiber yarn, having a mesh of from four to two hundred openings per inch.

16. The system of claim 14 wherein the composition both swells and includes a component which undergoes an endothermic phase change when exposed to hyperthermal conditions.

17. A system for protecting a substrate against hyperthermal heating comprising a thermal protective composition applied to the substrate, the composition including an epoxy resin, a polysulfide, and a component which undergoes an endothermic phase change when exposed to hyperthermal conditions, the composition exhibiting a small volume increase through the formation of an open cell matrix when exposed to hyperthermal conditions, the system further comprising at least one layer of a woven cloth embedded in the composition, the cloth being formed at least in part of graphite yarn, the system providing at least 20% longer protection under conditions of high temperature and high shear forces than a similar system in which the cloth is a fiberglass material.

18. A system for protection against hyperthermal heating comprising an active thermal protective composition and at least one foraminous layer of a cloth embedded in the composition, the active thermal protective composition responding to thermal extremes by at least one of expanding and undergoing an endothermic phase change. the cloth comprising a conformable, non-self-supporting, high-temperature, high-emissivity cardo polymer material with a heat-resistant carbon backbone.

\* \* \* \* \*